Nov. 24, 1970 M. NIEDEREDER 3,543,152
CIRCUIT ARRANGEMENT FOR THE DIGITAL MEASUREMENT OF ELECTRICAL
MAGNITUDES IN A LOGARITHMIC SCALE
Filed Oct. 22, 1965

INVENTOR
MARTIN NIEDEREDER
BY
ATTORNEYS

United States Patent Office 3,543,152
Patented Nov. 24, 1970

3,543,152
CIRCUIT ARRANGEMENT FOR THE DIGITAL MEASUREMENT OF ELECTRICAL MAGNITUDES IN A LOGARITHMIC SCALE
Martin Niedereder, Munich-Solln, Germany, assignor to Siemens Aktiengesellschaft, Berlin and Munich, Germany, a corporation of Germany
Filed Oct. 22, 1965, Ser. No. 505,139
Claims priority, application Germany, Dec. 21, 1964, S 94,741
Int. Cl. G01r 1/00, 17/06
U.S. Cl. 324—99
9 Claims

ABSTRACT OF THE DISCLOSURE

A circuit arrangement for the digital level evaluation of an electrical measurement magnitude, comprising means for producing a first reference magnitude which satisfies an expotential time function with defined time constant, first comparator means to which said measurement magnitude and said first reference magnitude are conducted, and in which both of these are compared with each other with respect to their amplitudes, operative to form a first comparator output pulse upon reaching a predetermined amplitude ratio, means for producing a second reference magnitude which is independent of time, second comparator means operative to form a second comparator output pulse upon an analogous amplitude comparison between said first reference magnitude and said second reference magnitude, means for the digital evaluation of the period of time between said first and second comparator output pulses, such means comprising a pulse generator for producing counting pulses which are being fed over a gate circuit open during such period of time to a pulse counter and being thereby counted, a logical circuit member being provided to which the first and second comparator output pulses are applied and which, in dependence on the mutual time orientation of said comparator output pulses, generates a polarity signal, which is allocated to said period of time, disposed in the path of said measurement magnitude to said first comparator, an adjustable attenuator, means for defining a counting range which is limited by two predetermined counting results attainable by said pulse counter, such means effecting a switch-over of said adjustable attenuator in the event the counting result of said electrical measurement magnitude falls outside said counting range, and means responsive to said polarity signal for controlling the switching-over of said adjustable attenuator, thereby changing one of said two predetermined counting results to a value which is indicated when no counting pulses are received.

---

The invention has as its basis the problem of a digital evaluation of electrical magnitudes. This measuring problem can be solved, for example, by the use of an analog-operative meter at the output of which there is connected an analog-digital converter of usual type. The measured analog value is there converted into a digital value, and, namely, according to the principle of stage coding, of time coding or other types of coding known in themselves. This process, however, is feasible only when the analog level measurement value, that is, the current or voltage serving for the analog level indication is proportional to the level, i.e. the logarithm of the measured input value. It is here disadvantageous that the achievable accuracy of measurement is given by the analog level measurement itself, which, in the conventional measuring devices, lies in the percent range.

A further possibility for the solution of this problem is the utilization of a voltage or current meter, known per se, without logarithmic evaluation (level evaluation) of the input measured value and to subsequently insert in the circuit a data processing stage, which automatically carries out a logarithmic evaluation of the digitally measured input measurement value. The circuit expenditure would be considerably greater, however, than in the method initially mentioned and would be further greatly increased at the required precision of measurement.

The present invention relates to a circuit arrangement for the digital level evaluation of electrical values to be measured, in which, with the avoidance of the disadvantage of the solutions indicated above, a great precision of measurement is achievable. The invention is characterized by the feature that the measurement magnitude, possibly rectified, is subjected in a comparator to an amplitude comparison with a like-type electrical reference magnitude of the definite time-dependence, in which process a first comparator pulse, formed on reaching a given amplitude ratio, together with a second, comparator output impulse in an analog amplitude comparison between the reference magnitude and a reference value, preferably adjustable in amplitude, independent as to time, limits a time interval digitally evaluatable in a known manner, and that the reference magnitude satisfies an expotential time function with defined time constant and is formed by the currents or voltages occurring in the build-up or collapse of an electrical or magnetic field.

The logarithmic evaluation of the measurement magnitude takes place in an analog operating level meter according to the first solution, initially mentioned, with the aid of an evaluation stage with logarithmic curved characteristic curve which can be realized only approximately, for example under use of a series of biased diodes in the form of a polygonal curve. If the logarithmic evaluation in the case of the second indicated solution is derived from a data processing stage, then, to be sure, the measuring precision can be increased, but in the process the circuit expenditure is correspondingly increased. Also in this last case there remains, however, a residual measuring inaccuracy which is due to the fact that the digital voltage or current meter connected at the input side contains a linearly evaluating coder, which, in the case of any reasonable expenditure on circuits, is subject to certain tolerances. If a time coder is involved, there then results, for example, tolerances with respect to the linearity of the sawtooth reference magnitude utilized. The circuit arrangement according to the invention offers, in contrast to this, an increase in the measuring accuracy up into the per thousandth range, which, furthermore, is associated with a lowering of the circuit expenditure.

A further important advantage of the invention resides in the fact that the reference point of the level scale (zero level) can be placed by corresponding choice of the reference magnitude at any arbitrary point on the measuring range. This adjusted zero level is here automatically taken into consideration and a positive and/or negative relative level with reference thereto is digitally indicated.

Further features and advantages of a circuit arrangement according to the invention are explained in detail in the following with the aid of a preferred example of construction illustrated in the drawing, in which.

Figure 1:
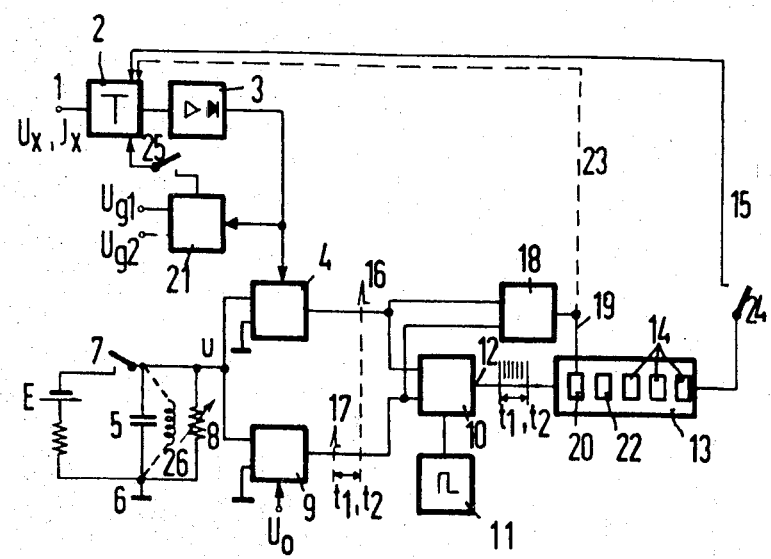
FIG. 1 illustrates a circuit arrangement which permits the setting of any desired reference point (zero level) and a digital evaluation of positive and negative relative levels.

In FIG. 1 a direct or alternating voltage, applied at 1, is fed over a calibrating line 2 and an amplifier 3, possibly with an inserted rectifier, to the first input of a comparator 4. The second comparator input is connected with one terminal of a capacitance 5, whose other terminal is grounded at 6. A discharge circuit for the capacitance 5 is completed over a resistor 8. The capacitance 5 is also connected with the first input of a reference voltage $U_o$. The outputs of both comparators 4, 9 are respectively connected to the first and second inputs of a gate circuit 10, while a third input thereof is connected to a pulse generator 11 and the output 12 of the gate circuit is connected with the input of a pulse-counter 13. The indication of the counter result there takes place in digital form, for example in a decimal number system, in which the individual digits of the digital measurement result are indicated in allocated fields 14. A switching command can be transmitted over a line 15 from the impulse counter 13 to the input-side of the calibrating line 2.

The manner of operation of the circuit according to FIG. 1 can be explained as follows: At the beginning of the measuring operation the switch 7 is closed and the capacitance 5 is charged to a voltage E. When the switch 7 is reopened, capacitance 5 then discharges, in which process the discharge voltage $u$ is reduced thereat, proceeding from the value E, according to an exponential time function. This discharge voltage $u$ represents a reference calue which is compared, as to amplitude, in the comparator 4 with the portion of the input voltage $U_x$ as adjusted on the calibrating line 2. Upon reaching equality of amplitude or a predetermined amplitude ratio between $u$ and $U_x$ a comparator output pulse 16 is formed, which is fed to the first input of the gate circuit 10. The discharge voltage $u$ is simultaneously fed to the first input of the comparator 9, in which it is compared with a constant reference voltage $U_o$, preferably adjustable in amplitude, in an analogous manner. A comparison result there arises in the form of a comparator output pulse 17.

Figure 2:
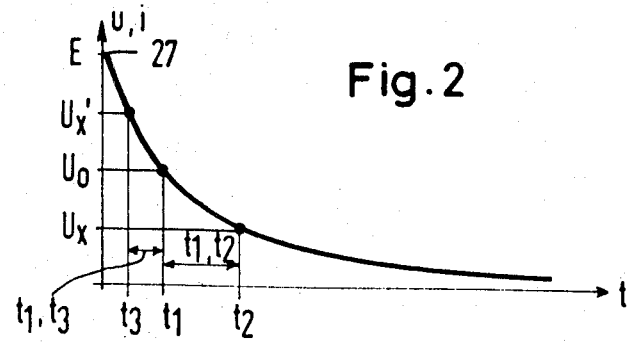
FIG. 2 represents a time diagram of the measuring process.

The time measuring course is clarified with the aid of the time diagram of FIG. 2. Here, the reference voltage $U_o$ and an input voltage $U_x$ are plotted on the ordinate. The intersection points with the discharge curve $u$ are designated as $t1$ and $t2$, while a comparison with FIG. 1 establishes that the comparator output pulse 17 is generated at time point $t1$, and the comparator output impulse 16 at time point $t2$. Since the discharge voltage curve $u$ has a strictly exponential time dependence, the time interval $t1$, $t2$ is strictly proportional to the logarithm of the voltage ratio $U_o/U_x$ and thereby to the voltage level with reference to $U_o$.

According to FIG. 1 the digital evaluation of the time interval $t1$, $t2$, to be interpreted as the coding result, which is defined by the comparator output pulses 16, 17, is effected, in a manner known per se, by means of the gate circuit 10, the pulse generator 11 and the pulse counter 13. Here, the pulse generator 11 is connected during the time interval under consideration to the output 12 of the gate circuit, in which arrangement the counting pulses occurring in the interval are counted by means of the pulse counter 13 and indicated at 14 in digital form. The time constant defined by the capacitance 5 and the discharge resistor 8 and/or the pulse sequence frequency of the pulse generator 11 can be so dimensioned, to particular advantage, that the measurement unit used for the level evaluation of the input voltage $U_x$, for example 1 neper or 10 db, under consideration of a conversion factor of $10^n$ ($n=1, 2, 3 \ldots$) corresponds to the duration of one period of the counting pulse sequence. Thereby it is achieved that the digital indication of the pulse counter 13 corresponds directly, i.e. without further recalculation, to the level value to be measured digitally.

The level value so indicated there signifies a relative level with reference to a zero level defined by the reference voltage $U_o$. In the value ratio between $U_o$ and $U_x$ represented in FIG. 2 there results for $U_x$ a negative relative level value. This is determined in the arrangement of FIG. 1 by means of a logical circuit member 18, which forms, in dependence on the reciprocal time orientation of the comparator output pulses 16 and 17, a recognition signal (yes-no determination), which is fed to the pulse counter 13 over a line 19 as a sign designation which is indicated in its own field 20. In the case of the measurement value $U_x < V_o$ there results a negative sign. On the assumption that a measurement value $U_{x'}$ is to be digitally evaluated which is greater than $U_o$, there results according to FIG. 2, the situation that the comparator output pulse 16 is generated at a time point $t3$ which lies ahead of $t1$. In this case the logical switching member 18 derives from the reversed mutual time orientation of the pulses a positive sign for the measurement result of the pulse counter 13.

Through a switching over, in itself known, preferably automatic, of the input calibrating line 2 in dependence upon the measurement value exceeding or falling below a certain measurement range, it can be achieved that the discharge voltage $u$ representing the reference value is utilized only for measurements in a certain amplitude range. It is thereby possible to meet desired accuracy requirements for the comparators 4 and 9 with a relatively small circuit expenditure. It can be assumed, for example, that the measurement voltages $U_x$ and $U_{x'}$ designated in FIG. 2, represent simultaneously the limits of the measuring range.

In this case the switching commands for the measuring range switch-over of the calibrating line 2, fed over the line 15 are emitted by the pulse counter 13 as soon as the level falls below the negative level of $U_x$ or exceeds the positive level of $U_{x'}$. The switch-over of the calibrating line 2 is carried out in stages, preferably, in such a manner that, on falling below the negative relative level $U_x$, the calibrating line attenuation is diminished to such a degree that a level increase takes place corresponding to the difference $U_o-U_x$, while upon exceeding the positive relative level $U_{x'}$ there takes place an analogous reduction of the input level corresponding to the difference $U_x-U_o$. The measurement range limits thus can be so selected that there is included therebetween a measuring range of, for example, 1 neper or 10 db. Here it is expedient to disconnect the automatic measuring range circuit at one or several of these measuring range limits within a small additional range, for example by opening switches 24 and 25, respectively, so that a number of measurement values, which lie in the proximity of the measurement range limits, can be effectively indicated. Through an overlapping of the measuring ranges there is avoided, a continual, undesired switching over of the calibrating line as a result of slight level changes within such a measuring series.

There further exists the possibility of making the automatic measuring range switch-over at the limits $U_x$ and $U_{x'}$ or, in the case of an overlap at measuring range limits that are slightly extended, for example, by 10%, in such a way that the switching command is given by a comparator 21, instead of the pulse counter 13 as a part of the input voltage fed to the comparator 4, which is compared in amplitude with adjustable voltages $U_{g1}$, $U_{g2}$, corresponding in amplitude to the measuring range limits or to the extended measuring range limits. Here, for example, the voltage $U_{g1}$ can correspond to the measuring range limit $U_{x'}$ in FIG. 2, $U_{g2}$ to the limit $U_x$.

If the measuring range is so determined in particular, whereby one limit coincides with the reference voltage $U_o$, corresponding, therefore, to a range of $U_o$ tto $U_x$ in FIG. 2, then on exceeding this limit a measuring range switch-over can occur only if simultaneously a switch-over of the reference voltage takes place to that value which corresponds to the other limit of the measuring range. Simultaneously there is also to be taken into account a sign change in the level indication. In the case of a range overlap at a measuring range limit coinciding with the reference voltage $U_o$ there is likewise to be noted the sign reversal registered by the logical switching member 18 and indicated at 20.

If the indicated level values are not to relate, as described above, to $U_o$ as the reference point (zero level) of the level scale (relative level measuring), but to an absolute level displaced relative thereto (absolute level measuring), then in the digital indication result of the pulse counter 13 there is set the absolute level value of $U_o$, expediently in other indication fields 22. This is possible if the measuring range, evaluable without switching over, corresponds to that level measure unit (for example 1 neper or 10 db) which is also used as a basis for the indicated numerical value. In contrast to relative level measuring, a range switch-over must take place when a range limit of the input voltage coinciding with the reference voltage $U_o$ is exceeded. This switch-over is carried out preferably in dependence on a switching command signal transmitted over a line 23 which command is generated in the logical switching member 18 on occurrence of a sign change. The switching commands for the range switch-over at the other measuring range limits are picked up expediently as in the relative level measuring from certain counter states of the pulse counter 13 and transmitted over the line 15 to the calibrating line 2, or generated by the comparator 21 as in the relative level measuring. A range overlapping, however, is not possible where the measuring range limits do not coincide with the reference voltage $U_o$, which expediently is taken into account in the amplitude adjustment of the voltages $U_{g1}$ and $U_{g2}$, or by opening of the switches 24 and 25, corresponding to the relative level measuring. At a measuring range limit coinciding with the reference voltage $U_o$ a measuring range overlapping in the absolute level measuring is possible when $U_o$ is adjusted to the absolute zero level.

Figure 3:
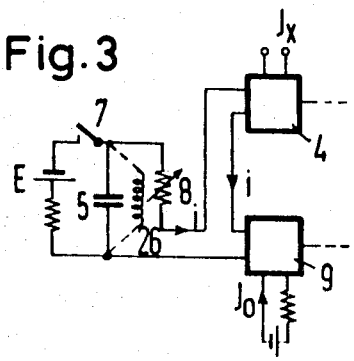
FIG. 3 illustrates a modification of the portion of the circuit of FIG. 1, which serves for the generation of a reference current with exponential time dependence.

Instead of the above-described voltage level measurement there can also be carried out a current level measurement. For this it is necessary to realize that the reference magnitude, which in the present example of construction consists of the discharge voltage $u$, having a corresponding current $i$ with like time dependence. It therefore is possible in this case to use, for example, the charging or discharge current of capacitance 5, which is then fed to the comparators 4 and 9 for the purpose of an amplitude comparison with the input current $J_x$ or a portion thereof. The reference current $i$ is expediently generated with the aid of a modified circuit in accordance with FIG. 3, in which circuit elements, insofar as they correspond to those represented in FIG. 1, are provided with the same reference symbols. In the case of a current level measurement, obviously, also the reference voltage $U_o$ and the auxiliary voltages $U_{g1}$ and $U_{g2}$ are replaced by corresponding currents $J_o$, $J_{g1}$ and $J_{g2}$.

In general, the reference magnitudes $u$ and $i$ in the sense of the invention can be formed by currents and voltages which occur in the recharging or in the buildup or collapse of electrical or magnetic fields. Thus, for example, the capacitance 5 can be replaced by an inductance 26, in this case there being utilized the recharging of a magnetic field.

Figure 4:
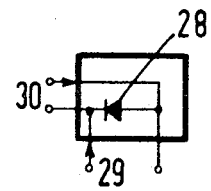
FIG. 4 illustrates a comparator, by means of which an amplitude comparison between two currents can be achieved.

The comparators 4, 9 and 21 utilized in the circuit arrangement according gto the invention represent circuit parts known per se. For the purpose of a voltage comparison, such a comparator may consist, for example, of a multiar circuit or a differential amplifier with Schmitt trigger connected at the output side. In a current comparison the comparator, for example according to FIG. 4, may contain a tunnel diode 28, to which the currents to be compared in amplitude are so fed, on the one hand over terminals 29 and, on the other hand, over terminals 30 that they are directed oppositely to one another. Likewise the gate circuit 10 and the pulse counter 13 are known circuits such as are used, for example, in conventional digital voltmeters. The logical switching member 18 consists preferably of a binary flip stage, which in each case is flipped by the comparator output pulses 16 and 17. Likewise the calibrating line 2 is known per se for range switch-over, in the usual digital voltage or current meters, the stepwise switchover in accordance with the invention expediently being so determined that the pass attenuation of the calibrating line 2 is always varied by constant amounts corresponding to the level measure units.

The circuit arrangement according to the invention has the further advantage that building-up processes which occur in the reference magnitude $u$ or $i$ at the start of the recharging process and which make themselves apparent in FIG. 2 as a deviation 27 from the exact function course, have with certainty died out before the actual measuring process begins.

The time constant determinate for the reference magnitude $u$ or $i$ can be varied, to advantage, by a change in the resistance 8 and in the circuit building-up or collapsing the electric field. In a quadratic rectification of the measuring magnitude lying on the terminal 1 it is necessary to so select the product from this time constant and the pulse sequence frequency of the pulse generator 11 that, also in this case, the unit of the measure (for example 1 neper, 10 db), used for the level evaluating of the input magnitude, corresponds, in consideration of a conversion factor of $10^n$ ($n=1, 2, 3 \ldots$), to a period duration of the counter pulse sequence.

In the use of the circuit arrangement according to the invention for the level evaluation of electrical operations or functions, a voltage or current level measurement can be made in the above-described manner on a measuring resistor of known magnitude which is calibrated, in a known manner, for the measurement involved.

Changes may be made within the scope and spirit of the appended claims which define what is believed to be new and desired to have protected by Letters Patent.

I claim:

1. A circuit arrangement for the digital level evaluation of an electrical measurement magnitude, comprising means for producing a first reference magnitude which satisfies an exponential time function with defined time constant, first comparator means to which said measurement magnitude and said first reference magnitude are conducted, and in which both of these are compared with each other with respect to their amplitudes, operative to form a first comparator output pulse upon reaching a predetermined amplitude ratio, means for producing a second reference magnitude which is independent of time, second comparator means operative to form a second comparator output pulse upon an analogous amplitude comparison between said first reference magnitude and said second reference magnitude, means for the digital valuation of the period of time between said first and second comparator output pulses, such means comprising a pulse generator for producing counting pulses which are fed over a gate circuit, open during such period of time, to a pulse counter and thereby counted, a logical circuit member to which the said first and second comparator output pulses are applied and which, in dependence on the mutual time orientation of said comparator output pulses generates a polarity signal, which is allocated to said period of time, an adjustable attenuator disposed in the path of said measurement magnitude to said first comparator, means operatively connected to said adjustable attenuator for defining a counting range which is limited by two predetermined counting results attainable by said pulse counter, such means effecting a switch-over of said adjustable attenuator in the event the counting result of said electrical measurement magnitude falls outside said counting range, and means operatively connecting said logical circuit member and said adjustable attenuator for controlling the switching-over of said adjustable attenuator responsive to said polarity signal thereby changing one of said two predetermined counting results to a value which is indicated when no counting pulses are received.

2. A circuit arrangement according to claim 1 wherein the first reference magnitude comprises the voltages occurring in the change in a capacitor charge over a circuit with constant ohmic resistances.

3. A circuit arrangement according to claim 1, wherein the first reference magnitude consists of the currents occurring in the change in a capacitor charge over a circut with constant ohmic resistances.

4. A circuit arrangement according to claim 1, wherein said means for producing said first reference magnitude includes means for varying the time constant of the exponential time function.

5. A circuit arrangement according to claim 4, wherein the time constant is so selected that the measuring unit used for the level evaluations of the electrical measurement magnitude corresponds to a time unit under consideration of a conversion factor of $10^n$ ($n=1, 2, 3 \ldots$).

6. A circuit arrangement according to claim 1, wherein the frequency of said pulse generator is adjustable whereby the sequence frequency of said counting pulses may be varied, the product of the time constant of said exponential time function and the sequence frequency being so selected that the measuring unit used for level evaluations of the electrical measurement magnitude corresponds under consideration of a conversion factor of $10^n$ ($n=1, 2, 3 \ldots$), to a period duration of the sequence frequency.

7. A circuit arrangement according to claim 1, wherein said attenuator is formed by a calibrating line disposed at the input side of said circuit to receive the electrical measurement magnitude.

8. A circuit arrangement according to claim 7, wherein the respective attenuation intervals of the calibrating line are dimensioned in such a way that the switching positions are taken into account by the numbers allocated to a position value of the digital indication.

9. A circuit arrangement according to claim 1, to which said electrical measurement magnitude is conducted and which further comprises an additional comparator means selectively connectable to said adjustable attenuator for effecting automatic control of the counting range switch-over, upon approach of the electrical measurement magnitude to a counting range limit established by a condition other than zero, and means for supplying to said additional comparator an auxiliary magnitude establishing by its amplitude the counting range limit, for the purpose of an amplitude comparison with the electrical measurement magnitude.

References Cited

UNITED STATES PATENTS

| | | | |
|---|---|---|---|
| 3,201,781 | 8/1965 | Holland | 324—99 |
| 3,281,828 | 10/1966 | Kaneko | 340—347 |
| 2,824,285 | 2/1958 | Hunt | 324—99 |
| 3,303,493 | 2/1967 | Charbonnier | 328—146 X |
| 2,220,602, | 11/1940 | Hellmann | 324—111 |
| 2,313,666 | 3/1943 | Peterson | 324—111 |
| 2,710,397 | 6/1955 | Foster | 324—99 X |
| 3,140,479 | 7/1964 | Chase | 340—347 |

OTHER REFERENCES

Weinberg, R. C.: "Modified Ramp Generator Develops High D-C Input Impedance," Feb. 21, 1964; Electronics; pages 33, 34 and 35; copy in 324–99.

Strassman, A. J.: "Automatic Measurement of Voltage Tolerances," Electronics; February 1956; pages 150 and 151; copy in 324-99D.

RUDOLPH V. ROLINEC, Primary Examiner

E. F. KARLSEN, Assistant Examiner

U.S. Cl. X.R.

324—111; 340—347